United States Patent
Decker et al.

(10) Patent No.: US 12,179,802 B2
(45) Date of Patent: Dec. 31, 2024

(54) METHOD FOR OPERATING A VEHICLE

(71) Applicant: MERCEDES-BENZ GROUP AG, Stuttgart (DE)

(72) Inventors: Michael Decker, Böblingen (DE); Rihab Laarousi, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 225 days.

(21) Appl. No.: 17/788,018

(22) PCT Filed: Oct. 12, 2020

(86) PCT No.: PCT/EP2020/078593
§ 371 (c)(1),
(2) Date: Jun. 22, 2022

(87) PCT Pub. No.: WO2021/129963
PCT Pub. Date: Jul. 1, 2021

(65) Prior Publication Data
US 2023/0026720 A1    Jan. 26, 2023

(30) Foreign Application Priority Data
Dec. 23, 2019  (DE) ............... 10 2019 009 068.3

(51) Int. Cl.
*B60W 60/00*   (2020.01)
*B60W 50/14*   (2020.01)

(52) U.S. Cl.
CPC ........ *B60W 60/0051* (2020.02); *B60W 50/14* (2013.01); *B60W 60/0059* (2020.02); *B60W 2540/227* (2020.02)

(58) Field of Classification Search
None
See application file for complete search history.

(56) References Cited

U.S. PATENT DOCUMENTS 11,541,790 B2 *  1/2023  Foltin ............... B60W 60/0059
2010/0222976 A1  9/2010  Haug
(Continued)

FOREIGN PATENT DOCUMENTS

DE  102006056094 A1  5/2008
DE  102010022433 A1  12/2011
(Continued)

OTHER PUBLICATIONS

U.S. Appl. No. 62/950,084, filed Dec. 18, 2019 (unpublished) (Year: 2019).*
(Continued)

*Primary Examiner* — Todd Melton
*Assistant Examiner* — Sarah A. Mueller
(74) *Attorney, Agent, or Firm* — PATENT PORTFOLIO BUILDERS PLLC

(57) ABSTRACT

A method for operating a vehicle, which can be operated in a manual and an automated driving mode is provided. Depending on a driving situation occurring in the automated driving mode, a take-over request for a user of the vehicle to take over a driving task is issued to the vehicle user. During the automated driving mode the vehicle monitors whether the vehicle user is able to comply with the take-over request at the time of the issued take-over request based on a current seat position of the vehicle user and/or a current seat setting of a vehicle seat of the vehicle user.

12 Claims, 1 Drawing Sheet

(56) References Cited

U.S. PATENT DOCUMENTS

| | | | |
|---|---|---|---|
| 2013/0218420 A1 | 8/2013 | Jendritza et al. | |
| 2017/0205823 A1 | 7/2017 | Arndt et al. | |
| 2018/0229743 A1 | 8/2018 | Aoi | |
| 2018/0272895 A1* | 9/2018 | Schmidt | B60W 60/0057 |
| 2019/0047417 A1 | 2/2019 | Aoi et al. | |
| 2019/0047588 A1 | 2/2019 | Yabuuchi et al. | |
| 2019/0049955 A1* | 2/2019 | Yabuuchi | A61B 5/1128 |
| 2021/0188324 A1* | 6/2021 | Kim | B60W 60/0051 |
| 2024/0124013 A1* | 4/2024 | Sawada | B60W 50/16 |

FOREIGN PATENT DOCUMENTS

| | | | |
|---|---|---|---|
| DE | 102013019788 A1 | 6/2014 | |
| DE | 102014007170 A1 | 12/2014 | |
| DE | 102016200513 A1 | 7/2017 | |
| DE | 112016005335 T5 | 8/2018 | |
| DE | 102017217603 B3 | 3/2019 | |
| JP | 2016078530 A | 5/2016 | |
| JP | 2018167623 A | 11/2018 | |
| JP | 2019034574 A | 3/2019 | |
| JP | 2019034575 A | 3/2019 | |
| JP | 2019034576 A | 3/2019 | |
| JP | 2019064539 A | 4/2019 | |

OTHER PUBLICATIONS

International Search Report mailed Jan. 22, 2021 in related/corresponding International Application No. PCT/EP2020/078593.

Office Action created Nov. 12, 2020 in related/corresponding DE Application No. 10 2019 009 068.3.

Written Opinion mailed Jan. 22, 2021 in related/corresponding International Application No. PCT/EP2020/078593.

Office Action dated Jul. 4, 2023 in related/corresponding JP Application No. 2022-537221.

Office Action dated Mar. 20, 2024 in related/corresponding Korean Application No. 10-2022-7020819.

* cited by examiner

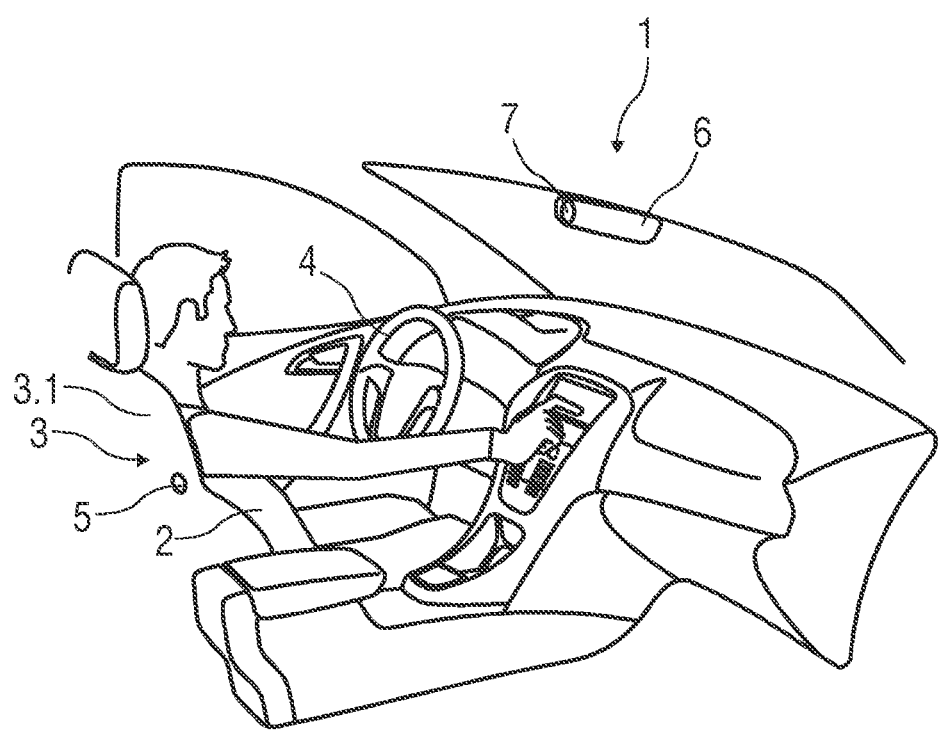

METHOD FOR OPERATING A VEHICLE

BACKGROUND AND SUMMARY OF THE INVENTION

Exemplary embodiments of the invention relate to a method for operating a vehicle, which can be operated in a manual and an automated driving mode, wherein, depending on a driving situation occurring in the automated driving mode, a take-over request for a user of the vehicle to take over a driving task is issued to the vehicle user.

DE 10 2013 019 788 A1 describes a method for the automatic operation of a vehicle in a driving mode that is automated by means of a driver assistance system and that does not require any user action. Intervention by a driver of the vehicle in steering and/or acceleration functions deactivates the automated driving mode of the driver assistance system. The driver assistance system continuously checks the prerequisites for the automated driving mode of the vehicle and, if the prerequisites are fulfilled, the automated driving mode is activated by the driver by actuation of a control element, provided that the driver does not significantly counteract a steering intervention of the driver assistance system.

Exemplary embodiments of the invention are directed to a method for operating a vehicle which can be operated in a manual and an automated driving mode.

A method for operating a vehicle, which can be operated in a manual and an automated driving mode, provides that, depending on a driving situation occurring in the automated driving mode, a take-over request for a user of the vehicle to take over a driving task is issued to the vehicle user. In accordance with the invention, during automated driving mode, the vehicle monitors whether the vehicle user is able to comply with the take-over request at the time of the issued take-over request with a current seat position of the vehicle user and/or a current seat setting of a vehicle seat of the vehicle user.

By applying the method, it can be determined comparatively easily whether the vehicle user has a seat position that is specific to him and is capable of allowing a take-over and/or whether the vehicle seat of the vehicle user is set and positioned in such a way that the vehicle user can perform the driving task of manually driving the vehicle without complications. To perform the method, it is not necessary to determine body proportions of the vehicle user, for example an arm length and an arm position of the vehicle user in relation to a distance of the vehicle user to a steering wheel of the vehicle, for example by a corresponding query.

In one embodiment of the method, at least one seat position of the vehicle user and/or at least one seat setting of a vehicle seat of the vehicle user are/is determined during manual driving mode of the vehicle and stored as at least one reference position. In this case, the reference position is used to check whether the vehicle user is positioned with respect to the steering wheel and/or pedals of the vehicle in such a way that he can take over the driving task of the vehicle. For example, the seat position of the vehicle user and/or the seat setting of the vehicle seat of the vehicle user are/is determined on the basis of detected signals from position sensors arranged on the vehicle seat and/or on the basis of detected image data from an interior camera oriented towards the vehicle seat.

In addition, a development provides that, during automated driving mode it is regularly checked whether the current seat position of the vehicle user and/or the current seat setting of the vehicle seat of the vehicle user lie or lies within a predefined tolerance range of the at least one reference position. In particular, it is regularly checked whether the current seat position of the vehicle user and/or the current seat setting of the vehicle seat of the vehicle user have or has changed, so that, for example, it is possible for the vehicle user to reach the steering wheel promptly in relation to the issuance of the take-over request.

In one possible embodiment, if it is determined that the current seat position of the vehicle user and/or the current seat setting of the vehicle seat of the vehicle user are/is outside the predefined tolerance range of the at least one reference position, a request is issued to the vehicle user for the vehicle user to correct his seat position and/or his seat setting. By means of the issued request, the vehicle user's attention is drawn to his posture and positioning in relation to the steering wheel and/or the pedals, wherein the vehicle user is given the opportunity to correct this.

In particular, in a further embodiment, a seat position of the vehicle user and/or a seat setting of the vehicle seat of the vehicle user are/is determined as the at least one reference position, which the vehicle user and/or vehicle seat of the vehicle user have/has at the time of a switchover from the manual driving mode to the automated driving mode. In this seat position and/or with this seat setting of the vehicle user's vehicle seat, the vehicle user's vehicle seat is substantially optimally oriented in relation to the steering wheel and the pedals and accordingly also has a vehicle user-specific position that can be assumed.

In a development of the method, the automated driving mode is deactivated after a predefined number of issued prompts to correct the seat position of the vehicle user and/or the seat setting of the vehicle seat of the vehicle user and after a predefined time period has elapsed. In particular, the deactivation occurs when a momentary health condition of the vehicle user detected in the vehicle allows the deactivation so that the vehicle user is forced to perform the manual driving mode. Otherwise, for example in the case of detected unconsciousness of the vehicle user, provision can be made to bring the vehicle to a safe standstill in automated driving mode.

As an alternative to storing only one seat position of the vehicle user and/or only one seat setting of the vehicle seat of the vehicle user as a reference position, it is provided that a plurality of seat positions of the vehicle user and/or a plurality of seat settings of the vehicle seat of the vehicle user are determined and are each stored as a reference position.

In this way, it can be largely ruled out that the request for correction of the seat position and/or seat setting is issued if the predefined tolerance range is exceeded by a small amount. In addition, there are vehicle users who change their seat position and/or the seat setting of the vehicle seat comparatively frequently, so that this is taken into account by storing a plurality of reference positions.

Furthermore, in a possible embodiment, the method provides that an allowable range comprises the reference positions and a tolerance range surrounding all these reference positions and/or the allowable range comprises a subset selected from all the stored reference positions and a tolerance range surrounding this subset and/or the allowable range comprises a mean reference position and a tolerance range surrounding this. In this case, the mean reference position is formed from a set of all reference positions or from the selected subset of reference positions, for example by forming an arithmetic mean value, a weighted arithmetic mean value or a median value.

It is hereby also specified that the request to correct the seat position and/or the seat setting is not issued inappropriately and that the vehicle user is provided with a comparatively large scope of freedom with regard to his seat positions and/or seat settings in the automated driving mode of the vehicle.

In another possible embodiment of the method, a selection of the subset is determined on the basis of a frequency analysis performed. In this case, only reference positions are selected that are located in a range in which reference positions occur frequently, so that statistical outliers are eliminated.

In addition, the method provides in a possible development that the plurality of seat positions of the vehicle user and/or the plurality of seat settings of the vehicle seat of the vehicle user are/is determined within a predefined time period of the manual driving mode of the vehicle, in particular within a time period predefined depending on the situation. The time period includes, for example, a time period in which the vehicle is driven on a motorway, a time period since an ignition start, or a total time period in which only this one vehicle user has driven the vehicle.

BRIEF DESCRIPTION OF THE DRAWING FIGURE

Exemplary embodiments of the invention are explained in more detail below with reference to a drawing.

In this:

The sole FIGURE shows schematically a perspective view of a detail of a vehicle with a vehicle user on a vehicle seat.

DETAILED DESCRIPTION

The single FIGURE shows a perspective detail of a vehicle 1 with a vehicle user 2 on a vehicle seat 3.

The vehicle 1 has an assistance system for automated driving mode, in which the vehicle user 2 fully hands over his driving task to the vehicle 1, so that the vehicle user 2 can pursue another activity, such as reading.

If the automated driving mode is implemented, it is necessary that the vehicle user 2 is able to take over the driving task within a predefined time period in order to move the vehicle 1 in the manual driving mode. To take over the driving task, a take-over request is issued to the vehicle user 2 by the vehicle, in particular depending on an existing driving situation. Such a driving situation can be, for example, that automated driving mode is not possible on a section of the route ahead of the vehicle 1, for example due to prevailing weather conditions.

In the event that the vehicle user 2 has moved the vehicle seat 3 towards the rear region and/or has inclined a seat back 3.1 of the vehicle seat 3 towards the rear region in order to assume a reclining position, it is possible that the vehicle user 2 is located so far away from a steering wheel 4 and/or a pedal set (not shown in more detail) that it might not be possible for the vehicle user 2 to assume a driving position quickly enough to immediately comply with a take-over request of the vehicle 1. Thus, the taking over of the driving task is endangered, whereby there is a risk that the vehicle user 2 exposes not only himself to danger.

In addition, there is a risk that the vehicle user 2 is not able to follow a momentary event in an environment of the vehicle 1 due to his seat position and/or seat setting of the vehicle seat 3, such that the vehicle user 2 cannot fulfil his/her obligation to react at least to obvious circumstances in the environment of the vehicle 1.

The seat setting of the vehicle seat 3 of the vehicle user 2 is very individual, wherein a seat position of the vehicle user 2 and a seat setting of the vehicle seat 3 of the vehicle user 2 capable of allowing a take-over require that the vehicle user 2 be able to reach the steering wheel 4 and the pedals.

In order to determine whether the vehicle user 2 has a seat position and the vehicle seat 3 has a seat setting such that the vehicle user 2 is able to comply with a take-over request within a predefined time period, a method described below is provided.

For this purpose, at a time when the vehicle user 2 activates the automated driving mode, the current seat position of the vehicle user 2 and the seat setting of the vehicle seat 3 are determined and stored as a reference position.

Position sensors 5 are arranged on the vehicle seat 3 to determine the seat setting of the vehicle seat 3, on the basis of which a seat position of the vehicle user 2 can be derived. The position sensors 5 detect signals so that an inclination of the seat back 3.1 and a position of the vehicle seat 3 in the longitudinal direction within the vehicle 1 are determined.

In addition, the reference position in relation to the seat position and the seat setting can also be determined on the basis of captured image data from an interior camera 7 directed at the vehicle seat 3 and thus at the vehicle user 2. In the present example, the interior camera 7 is integrated in an interior mirror 6 of the vehicle 1, but it can also be arranged at another suitable location in the vehicle interior, for example in an instrument cluster of the vehicle 1. In particular, the reference position can be determined on the basis of a head and/or torso position of the vehicle user 2. In this case, a vehicle user-specific position represents the reference position that is stored in the vehicle 1.

During an automated driving mode of the vehicle 1 following the manual driving mode, it is monitored at regular intervals or continuously whether the seat position of the vehicle user 2 and the seat setting of the vehicle seat 3 are outside an allowable range. This allowable range comprises the stored reference position and a tolerance range surrounding it.

The tolerance range can be fixedly predefined or determined individually for each vehicle user.

If the seat position of the vehicle user 2 and the seat setting of the vehicle seat 3 are outside the tolerance range, it is assumed that the vehicle user 2 does not have a seat position that is capable of allowing a take-over, so that a request to correct the seat position and the seat setting is issued to the vehicle user 2.

If the vehicle user 2 does not comply with a repeatedly issued request to correct the seat position and seat setting within a predefined time period, wherein the requests can represent escalation levels, then the automated driving mode of the vehicle 1 is automatically terminated. As a result, the vehicle user 2 is forced to assume a seat position that is capable of allowing a take-over.

In one embodiment, a state of health of the vehicle user 2 is determined using image data captured by means of the interior camera 7, so that the automated driving mode of the vehicle 1 is not automatically terminated if it is detected that the vehicle user 2 is unconscious, for example, and cannot comply with requests to correct his seat position. If the vehicle user 2 displays a questionable state of health, the vehicle 1 is brought to a safe standstill in automated driving mode and, if necessary, an emergency call is made automatically.

It is also conceivable that a plurality of seat positions and seat settings are determined and stored as the relevant reference position The allowable range then comprises the reference positions and a tolerance range surrounding all these reference positions. Alternatively, or additionally, the allowable range comprises a subset selected from all the stored reference positions and a tolerance range surrounding that subset. Alternatively, or additionally, the allowable range comprises a mean reference position and a tolerance range surrounding it, wherein the mean reference position is formed from a set of all reference positions or from the selected subset of reference positions.

A selection of the subset of reference positions is carried out in particular by a frequency analysis, wherein only reference positions are selected that are located in a range in which reference positions occur in clusters, in order to thus eliminate statistical outliers.

In a further embodiment, the method provides that a history is taken into account so that obsolete reference positions related to the vehicle user 2 are eliminated.

In addition, the method provides that a seat position and a seat setting are stored as a reference position which the vehicle user 2 and the vehicle seat 3 have had at a past moment in time, and the vehicle user 2 has not complied with the request to correct the seat position and the seat setting within the predefined time period. For example, this requires the vehicle user 2 to make a corresponding input to confirm his decision not to correct the seat position.

As described above, the tolerance range can be fixedly predefined or determined individually for each vehicle user. For example, the tolerance range can be determined based on a distribution of a plurality of determined or selected reference positions.

If the vehicle user 2 changes his/her seat position and his/her seat setting relatively rarely, the reference positions accumulate in a comparatively narrow range, so that the tolerance range can be selected to be smaller than in cases in which the reference positions of a vehicle user 2 are distributed over a relatively wide range. In these cases, the vehicle user 2 changes his/her seat position and his/her seat setting noticeably and comparatively frequently.

For example, the reference position can also be determined in a situation during the automated driving mode of the vehicle 1 if the vehicle user 2 has reacted immediately and correctly after issuing a take-over request and has taken over the driving task.

If a plurality of seat positions and seat settings of the vehicle seat 3 are determined for the detection of reference positions, it is intended to determine the seat positions and seat settings in a certain time period of the manual driving mode.

The certain time period may comprise a time period during which the vehicle 1 is moved on a motorway in manual driving mode. Alternatively, or additionally, the time period comprises a time period since ignition start, i.e., a time period of a total driving time of the vehicle 1 in manual driving mode until a switch to automated driving mode or until a switch-off of the ignition. Again, alternatively, or additionally, the time period may comprise a total time period during which a single vehicle user 2 has driven the vehicle 1. For this purpose, the vehicle user 2 is identified, for example, by means of a vehicle key, via facial recognition and/or by means of a corresponding input by the vehicle user 2. In this case, the total period can also be an entire service life of the vehicle 1. Through the identification of the vehicle user 2, his data, which serve to determine his reference position or his reference positions, can be stored in a vehicle user-specific memory.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle, which can be operated in a manual and an automated driving mode, the method comprising:
    monitoring, by the vehicle during the automated driving mode, whether a vehicle user is able to comply with a take-over request when the take-over request is issued based on a current seat position of the vehicle user or a current seat setting of a vehicle seat of the vehicle user; and
    issuing, based on a driving situation occurring in the automated driving mode, the take-over request for the user of the vehicle to take over a driving task of the vehicle,
    wherein at least one seat position of the vehicle user or at least one seat setting of the vehicle seat of the vehicle user is determined during the manual driving mode of the vehicle and stored as at least one reference position, the method further comprising
    regularly checking, during the automated driving mode, whether the current seat position of the vehicle user or the current seat setting of the vehicle seat of the vehicle user lies within a predefined tolerance range of the at least one reference position; and
    issuing a request to the vehicle user to correct the driver's seat position or the driver's seat setting if it is determined that the current seat position of the vehicle user or the current seat setting of the vehicle seat of the vehicle user is outside the predefined tolerance range of the at least one reference position,
    wherein the automated driving mode is deactivated, responsive to, and after
        a predefined number of issued prompts to correct the seat position of the vehicle user or the seat setting of the vehicle seat of the vehicle user, and
        a predefined time period has elapsed.

2. The method of claim 1, wherein a seat position of the vehicle user or a seat setting of the vehicle seat of the vehicle user at a time of a switchover from the manual driving mode to the automated driving mode is determined as the at least one reference position.

3. The method of claim 1, wherein a plurality of seat positions of the vehicle user or a plurality of seat settings of the vehicle seat of the vehicle user are determined and are each stored as a reference position.

4. The method of claim 3, wherein
an allowable range of the predefined tolerance range comprises the stored reference positions and a tolerance range surrounding all stored reference positions,
the allowable range of the predefined tolerance range comprises a subset selected from all of the stored reference positions and a tolerance range surrounding the subset, or
the allowable range of the predefined tolerance range comprises a mean reference position and a tolerance range surrounding the mean reference position; wherein the mean reference position is formed from all stored reference positions or from a selected subset of the stored reference positions.

5. The method of claim 4, wherein a selection of the subset is determined based on a frequency analysis.

6. The method of claim 3, wherein the plurality of seat positions of the vehicle user or the plurality of seat settings of the vehicle seat of the vehicle user is determined within a predefined time period of the manual driving mode of the vehicle.

7. A method for operating a vehicle, which can be operated in a manual and an automated driving mode, the method comprising:
monitoring, by the vehicle during the automated driving mode, whether a vehicle user is able to comply with a take-over request when the take-over request is issued based on a current seat position of the vehicle user or a current seat setting of a vehicle seat of the vehicle user and based on a state of health of the vehicle user; and
issuing, based on a driving situation occurring in the automated driving mode, the take-over request for the user of the vehicle to take over a driving task of the vehicle,
wherein at least one seat position of the vehicle user or at least one seat setting of the vehicle seat of the vehicle user is determined during the manual driving mode of the vehicle and stored as at least one reference position, the method further comprising
regularly checking, during the automated driving mode, whether the current seat position of the vehicle user or the current seat setting of the vehicle seat of the vehicle user lies within a predefined tolerance range of the at least one reference position; and
issuing a request to the vehicle user to correct the driver's seat position or the driver's seat setting if it is determined that the current seat position of the vehicle user or the current seat setting of the vehicle seat of the vehicle user is outside the predefined tolerance range of the at least one reference position,
wherein, when the monitored state of the health of the vehicle user indicates that the vehicle user can manually drive the vehicle, the automated driving mode is deactivated, responsive to, and after
a predefined number of issued prompts to correct the seat position of the vehicle user or the seat setting of the vehicle seat of the vehicle user, and
a predefined time period has elapsed; and
wherein when the monitored state of the health of the vehicle user indicates that the user cannot manually drive the vehicle, the automated driving mode is maintained and the vehicle is brought to a standstill in the automated driving mode.

8. The method of claim 7, wherein a seat position of the vehicle user or a seat setting of the vehicle seat of the vehicle user at a time of a switchover from the manual driving mode to the automated driving mode is determined as the at least one reference position.

9. The method of claim 7, wherein a plurality of seat positions of the vehicle user or a plurality of seat settings of the vehicle seat of the vehicle user are determined and are each stored as a reference position.

10. The method of claim 9, wherein
an allowable range of the predefined tolerance range comprises the stored reference positions and a tolerance range surrounding all stored reference positions,
the allowable range of the predefined tolerance range comprises a subset selected from all of the stored reference positions and a tolerance range surrounding the subset, or
the allowable range of the predefined tolerance range comprises a mean reference position and a tolerance range surrounding the mean reference position; wherein the mean reference position is formed from all stored reference positions or from a selected subset of the stored reference positions.

11. The method of claim 10, wherein a selection of the subset is determined based on a frequency analysis.

12. The method of claim 9, wherein the plurality of seat positions of the vehicle user or the plurality of seat settings of the vehicle seat of the vehicle user is determined within a predefined time period of the manual driving mode of the vehicle.

* * * * *